United States Patent [19]

Peterson

[11] Patent Number: 5,082,682

[45] Date of Patent: Jan. 21, 1992

[54] NONFAT FROZEN DAIRY DESSERT WITH METHOD AND PREMIX THEREFOR

[75] Inventor: Benjamin R. Peterson, West Chicago, Ill.

[73] Assignee: Fantasy Flavors, Inc., Carol Stream, Ill.

[21] Appl. No.: 611,233

[22] Filed: Nov. 9, 1990

[51] Int. Cl.$^5$ .............................................. A23G 9/00
[52] U.S. Cl. .................................. 426/564; 426/565; 426/567; 426/568; 426/804; 426/658; 426/583
[58] Field of Search ............... 426/564, 565, 566, 567, 426/804, 658, 613, 583

[56] References Cited

U.S. PATENT DOCUMENTS

| | | | |
|---|---|---|---|
| 3,111,408 | 11/1963 | Cheng et al. | 426/564 |
| 3,128,193 | 4/1964 | Hilker | 426/565 |
| 3,345,185 | 10/1967 | Pisani et al. | 426/565 |
| 3,510,316 | 5/1970 | Decker | 426/565 |
| 3,556,813 | 7/1971 | Creswick | 426/570 |
| 3,792,182 | 2/1974 | Carpigiani | 426/565 |
| 3,800,036 | 3/1974 | Gabby et al. | 426/565 |
| 3,809,764 | 5/1974 | Gabby et al. | 426/565 |
| 3,928,649 | 12/1975 | Cobb | 426/567 |
| 4,110,476 | 8/1978 | Rhodes | 426/565 |
| 4,308,294 | 12/1981 | Rispoli et al. | 426/564 |
| 4,333,953 | 6/1982 | Trzecieski | 426/565 |
| 4,400,405 | 8/1983 | Morley et al. | 426/565 |
| 4,400,406 | 8/1983 | Morley et al. | 426/565 |
| 4,435,439 | 3/1984 | Morris | 426/565 |
| 4,497,841 | 2/1985 | Wudel et al. | 426/565 |
| 4,542,035 | 9/1985 | Huang et al. | 426/565 |
| 4,552,773 | 11/1985 | Kahn et al. | 426/564 |
| 4,631,196 | 12/1986 | Zeller | 426/565 |
| 4,734,287 | 3/1988 | Singer et al. | 426/567 |
| 4,832,976 | 5/1989 | Griffin et al. | 426/567 |
| 4,840,813 | 6/1989 | Greenberg et al. | 426/565 |
| 4,855,156 | 8/1989 | Singer et al. | 426/567 |

FOREIGN PATENT DOCUMENTS

| | | |
|---|---|---|
| 0323529 | 7/1989 | European Pat. Off. |
| 33910A/19 | 9/1976 | Japan |
| 3222647 | 9/1988 | Japan |
| 1446144 | 8/1976 | United Kingdom |

OTHER PUBLICATIONS

Corn Syrups and Sugars, Corn Ind. Res Found Inc. N.Y. 1958 p. 15.

"A 900 Calorie Frozen Dessert", vol. 44, No. 6, p. 22 (Mar. 1961).

W. S. Arbuckle, "Ice Cream", Chapters 4, 5, 11, and 12, and Appendix E, Fourth Ed., AVI Publishing Co. Inc. (1986).

B. H. Webb, "Fundamentals of Dairy Chemistry", 2d Edition, pp. 886-913 (1974).

*Primary Examiner*—Jeanette Hunter
*Attorney, Agent, or Firm*—Willian Brinks Olds Hofer Gilson & Lione

[57] ABSTRACT

A nonfat dairy dessert composition which may be aerated and frozen, containing milk solids nonfat, water, sweetener a starch hydrolysate, egg albumen stabilizer and emulsifier.

41 Claims, No Drawings

NONFAT FROZEN DAIRY DESSERT WITH METHOD AND PREMIX THEREFOR

BACKGROUND OF THE INVENTION

The present invention generally relates to frozen desserts and their preparation. More particularly, it relates to nonfat frozen desserts with the organoleptic characteristics of high fat ice creams and related frozen desserts. The present invention also relates to the methods for making these nonfat frozen desserts, and the dry blends used in preparing the nonfat liquid compositions or mixes from which the frozen desserts are produced.

"Frozen dessert" is a generic term applied to a wide variety of products including ice cream, hard frozen and soft serve ice milks, sherbets, mellorines, water ices, and hard and soft frozen yogurts. Federal and state standards exist for all of these products with the exception of frozen yogurts where no federal standards currently exist and only a few states have developed compositional standards.

Among the "dairy" frozen desserts, minimum standards exist for milk fat and/or milk solids content. For example, ice cream must contain not less than 10% milk fat and 20% total milk solids (comprised of the total of milk fat and milk solids non-fat, "MSNF"); ice milk must contain 2 to 7% milk fat and not less than 11% total milk solids; and sherbet must contain 1 to 2% milk fat and 2 to 5% total milk solids.

All of these products are prepared from a mixture of dairy ingredients (mellorine being the exception with vegetable fat substituted for butterfat), sweeteners, stabilizers, emulsifiers, and flavorings with or without colorings. The ingredients are pasteurized in liquid form, homogenized, flavored, and frozen under agitation to incorporate air, then hardened and stored frozen for distribution and consumption.

Frozen yogurt desserts involve the addition of yogurt after pasteurization of the other ingredients where viable live organisms normally contained in non-frozen yogurt are deemed of value when present in the final product.

The formulations, preparation methods, and descriptions of the various frozen desserts mentioned above are described generally in W. S. Arbuckle's "Ice Cream", fourth edition, The AVI Publishing Company, Inc., Westport, Conn., 1986, the disclosure of which is incorporated by reference herein for purposes of establishing the background of the invention.

"Premium" and "Super Premium" ice creams are identified by higher butterfat levels of 14–18%, high total solids from the higher percentages of butterfat, milk, solids, and/or sweeteners used, and are frequently lower in overrun (less air being incorporated into the frozen product). A disadvantage with these products are; high price, a large number of calories, and a high level of cholesterol.

Ice creams and other whipped frozen dairy desserts are actually rather complicated foams consisting of air bubbles surrounded by a partly frozen emulsion wherein ice crystals and solidified fat globules are embedded in the unfrozen water phase. Estimates of the sizes of the coarsely dispersed structural components of ice cream vary. Ice crystal sizes are reported to vary in size between 20 to 60$\mu$ in diameter and to be situated approximately 7$\mu$ apart; air cells are reported to range in size between 10 to 175$\mu$ and to be situated about 125$\mu$ apart; and solidified fat globules are reported to vary in size from 0.2 to 2.0$\mu$ and to form agglomerations providing a "skin" around trapped air cells. See, "Fundamentals of Dairy Chemistry", 2nd Ed., 1983, Webb, B. H., et al., eds., Avi Publishing Company, Inc., Westport, Conn., at pages 896-913, the disclosures of which are incorporated by reference herein for purposes of establishing the background of the invention.

It is well known that the fat content of frozen dairy desserts plays a substantial role not only in the body and texture of the product, but also its flavor characteristics. Smoothness of ice cream texture is essentially inversely proportional to the average size of ice crystals. Increases in the milk fat content for virtually any given frozen dessert formulation will both decrease the ice crystal size and the distance between crystals. For example, the so-called "premium grade" ice creams are essentially characterized by higher than standard milk fat contents in the range of 15 to 18% and are recognized as products of correspondingly increased palatability and smoothness and enhanced body and texture in comparison to standard grade ice cream and dairy dessert products having lower fat contents.

Therefore, numerous attempts have been made to provide nonfat frozen desserts which exhibit organoleptic qualities of conventional or even premium and super premium ice creams. Prior to the present invention, nonfat, cholesterol-free frozen desserts have not been able to achieve equivalent organoleptic qualities.

"No-fat" or "nonfat" frozen desserts contain no added butter or vegetable fat and have a fat level of less than 0.5 percent by weight. When the fat is replaced, additional nonfat milk solids, sweeteners, stabilizers and/or emulsifiers must be supplied to yield similar body and freeze down characteristics.

The removal of fats from frozen desserts necessitates replacing them with other ingredients to facilitate whipping of the products and to achieve their stability during distribution and storage. Fat free frozen desserts are very complex systems in which gas bubbles are dispersed in a continuous liquid phase known as lamellae. Certain proteins are effective foaming agents essential to obtaining a desired overrun, i.e. a desirable degree of aeration, in frozen desserts. Other proteins are able to form protective layers/barriers separating entrapped gas bubbles from lamellae by absorbing at the gas/liquid interface. Whey proteins, egg white proteins, casein micelles, $\beta$-casein and others possess good foam-forming properties. The glycoproteins of egg whites (ovomucoid and ovalbumin) help stabilize foams because they absorb and retain water in the lamellae. Egg whites reportedly have little effect on conventional frozen desserts such as ice cream, probably due to the fact that the fat globules break down the egg white foam very readily. For this reason manufacturers of angel food cake mixes point out that the mixing bowls used for whipping up an angel food cake mix should be totally free of fat residues.

Difficulties in producing nonfat dairy based aerated frozen desserts are compounded when the fat solids are replaced by lower molecular weight ingredients which affect the freezing point and the meltdown during consumption. Furthermore, distribution of these nonfat aerated frozen desserts has typically shown more vulnerability to heat shock instability because of the lack of fat.

SUMMARY OF THE INVENTION

Briefly stated, the invention is directed to nonfat aerated desserts together with methods and a pre-mix for making them. As used herein and in the appended claims, the term "aerated dessert" refers to the frozen and the soft serve dairy desserts and the frozen and soft serve yogurt desserts of the present invention. A nonfat frozen aerated dairy dessert is prepared from a liquid composition which includes at least about 9 weight percent milk solids nonfat; at least about 62 weight percent water; a sweetener; between about 2 and about 6 weight percent dextrin type solids; between about 0.25 and about 1.25 weight percent egg albumen; between about 0.08 and about 0.42 weight percent of stabilizers; and between about 0.05 and about 0.45 weight percent emulsifiers.

The pre-mix or dry blend useful for making the aerated desserts of the present invention includes between about 40 and about 80 weight percent dextrin type solids; between about 2 and about 20 weight percent egg albumen; between about 1.5 and about 8 weight percent stabilizers; between about 1 and about 8 weight percent of emulsifiers. Flavors, colors, and sugar diluents may also be added for standardization purposes.

The method of making the nonfat frozen dairy dessert of the present invention includes the steps of combining the liquid ingredients and the dry ingredients. Agitating the ingredients to produce a liquid composition or mix.

Fruits, nuts, variegating sauces, candies, and flavorings can then be added before packaging in the same fashion as with conventional frozen desserts.

After packaging, the nonfat frozen dessert is placed in a hardening room for final freeze down at a temperature of at least about $-30°$ F.

The present invention provides for a wide variety of nonfat frozen and soft serve dessert products similar to ice cream, hard frozen and soft serve ice milks, sherbets, mellorines, water ices, and hard and soft frozen yogurts. The present invention is advantageous in that it provides nonfat aerated frozen and soft serve dairy desserts that contain less than 0.5% butterfat by weight and also can be identified as being cholesterol free, but have the organoleptic characteristics of ice creams containing 10–16% butterfat by weight.

It is noted that, unless otherwise stated, all percentages given in this specification and the appended claims refer to percentages by weight of the liquid composition which does not include added ingredients such as fruits, nuts, variegated sauces and candies.

It is noted that the term "milk solids nonfat" or "MSNF" as used in this specification and the appended claims refers to the proteins, lactose and minerals found in skim milk, nonfat dry milk, the milk solids nonfat derived from skim milk, condensed skim milk, and mixtures thereof, either sweetened or unsweetened and either in their liquid or dry form.

It is also noted that the term "liquid composition or mix" as used in this specification and the appended claims is intended to refer to the liquid state that the ingredients of the invention are in prior to being aerated and frozen.

It is further noted that when the term "frozen" is used with either "dairy dessert" or "yogurt" as used in this specification and the appended claims, it is intended to refer to a product that is comparable to the fat containing frozen ice creams that are well known in the art. Also, it is noted that the term "soft serve" when used with "dairy dessert" and "yogurt" as used in this specification and the appended claims, is intended to refer to a product that is comparable to the fat containing soft serve ice creams that are well known in the art.

These and other objects, advantages, and features of the present invention will be better understood upon review of the following detailed description of the preferred embodiments.

DETAILED DESCRIPTION OF THE PREFERRED EMBODIMENTS

According to the most preferred embodiment of the nonfat frozen dairy dessert, the liquid ingredients of the liquid composition can be combined in a conventional ice cream manufacturing mix processing apparatus, agitated and heated prior to adding the dry ingredients.

Preferably, the liquid ingredients consist essentially of MSNF, water, together with corn syrup, and or other liquid sweeteners and flavors.

Preferably, the dry ingredients consist essentially of dextrin type solids, corn syrup solids, egg albumen, together with stabilizers, emulsifiers, sweeteners, and flavors.

The MSNF can be supplied by nonfat dry milk, skim milk, condensed skim milk and mixtures thereof. Where the MSNF is derived from skim milk, condensed skim milk, and mixtures thereof, the skim milk preferably contains about 8 percent MSNF and the condensed skim milk preferably contains about 30 percent MSNF.

The MSNF may be of a high heat, medium heat, or a low heat type or a combination thereof.

The MSNF is present at a level of at least about 9 percent of the liquid composition. At a level below about 9 percent the texture and body of the final nonfat frozen dairy dessert is significantly reduced. Preferably, the MSNF comprises between about 9 percent and about 15 percent of the liquid composition. Above about 15 percent MSNF the frozen dessert takes on a pronounced dairy note. Most preferably, the MSNF comprises about 12.25 percent of the liquid composition.

Alternatively, where the MSNF consists of a mixture of nonfat dry milk and skim milk, the skim milk comprises about 69.25 percent and the nonfat dry milk comprises about 6.30 percent of the liquid composition.

Where the MSNF consists of a mixture of condensed skim milk and skim milk, the MSNF is preferably at a level of about 75.55 percent of the liquid composition with the condensed skim milk comprising about 26.90 percent and the skim milk comprising about 48.65 percent.

Water or moisture is added to produce the liquid mix composition, which when processed as described herein will result in the nonfat frozen aerated dairy dessert of the present invention.

The moisture is adjusted so that it comprises at least about 62 percent of the liquid composition. Below about 62 percent the product becomes very difficult to freeze down and also becomes excessively sweet. Preferably, the water is present between about 62 and about 68 weight percent of the liquid mix. Above about 68 percent the product loses body and texture and creates freezing problems. More preferably, water is present at about 65 percent.

The dry ingredients of the most preferred embodiment are then added to the liquid ingredients while agitating and heating. Preferably, the temperature should be less than about 120° F. The ingredients are agitated until the mixture is completely uniform and free of lumps.

The dextrin type solids of the present invention generally include dextrins, low DE corn syrup, and maltodextrins. The dextrin type solids are used to adjust the freezing point, control sweetness, and improve texture and mouthfeel. The most preferred dextrin type solid is maltodextrin.

The level of maltodextrin is at least about 2 percent of the liquid composition. Preferably, the maltodextrin is present at between about 2 and about 6 percent. Levels below about 2 percent typically result in a product that is weak in body and texture and melts too quickly. Levels above about 6 percent typically result in a product that is chewy and melts too slowly. Most preferably, the maltodextrin is present at about 4 percent.

Corn syrup is optionally added as a shelf life improver, a sweetener balancer, and as a control for the freezing point of the liquid composition. In addition, the corn syrup will also contribute firmness to the final frozen dessert product.

Generally, four major types of corn syrup are used in preparinq frozen desserts; low conversion (28-38DE), regular conversion (38-48DE), intermediated conversion (48-58DE), and high conversion (58-68DE). Typically, the low conversion types will raise the freezing point of the liquid composition and the high conversion types will lower the freezing point of the liquid composition. Preferably the corn syrup used is 36DE, 42DE, or a mixture thereof.

The corn syrup is added so that the liquid composition contains at least about 3 percent of corn syrup. Preferably, the corn syrup is between about 3 and about 15 percent.

The egg albumen (otherwise known as egg white proteins) used in the invention can be provided by dried egg whites, fresh egg whites, or a mixture thereof. When referring to amounts or percentages of egg albumen, it is intended to mean on a solids basis, or dry weight. It has been found that the use of egg albumen at the more preferred level creates foam stability to the liquid composition and produces the desired richness and mouthfeel similar to fat containing frozen desserts. Most preferably, the egg albumen consists essentially of dried egg whites.

The egg albumen comprises, on a solids basis, at least about 0.25 percent of the liquid composition. Preferably the egg albumen is, on a solids basis, between about 0.25 and about 1.25 percent of the liquid composition. At a level above about 1.25 percent, the overrun is difficult to control and the texture and flavor of the final product are adversely affected. More preferably, the egg albumen is between about 0.25 and about 0.75. Most preferably, the egg albumen is present at about 0.50 percent.

Stabilizers and emulsifiers are also added to the liquid composition. It has been found that the proper combination of stabilizers and emulsifiers will optimize the thickening, suspension, and emulsification of the liquid composition to thereby simulate the body, texture, sweetness, and meltdown of high quality fat containing ice cream. The stabilizers and emulsifiers of the present invention also protect the resulting nonfat frozen desserts from heat shock caused by fluctuating temperatures during distribution and storage and maintain the product consistency until consumed.

It is thought that, without being bound by any theory, the stabilizers and emulsifiers, in combination, together with the MSNF, egg albumen, sweeteners and dextrin type solids will absorb and hold large amounts of unbound water so that a stable foam is maintained prior to and during the freezing and subsequent storage and handling. They also appear to have an effect on the viscosity and whipping of the liquid composition, the type of body resulting in the frozen dessert, the meltdown characteristics, and retardation of ice crystal growth.

The stabilizers used in the present invention preferably include gum arabic, guar gum, locust bean gum, carrageenan, cellulose gel, carboxymethyl cellulose, xanthan gum, alginate, konjac flour, gellan gum, and mixtures thereof. Preferably the stabilizers consist essentially of a mixture of carrageenan, locust bean gum, and guar gum.

Where the preferred stabilizers are used, the carrageenan comprises between about 0.01 and about 0.05 weight percent of the liquid composition. More preferably, the carrageenan comprises between about 0.01 and about 0.03 percent. Most preferably, the carrageenan is at about 0.013 percent. The locust bean gum comprises between about 0.05 and about 0.25 weight percent of the liquid composition. More preferably, the locust bean gum is between about 0.1 and 0.15 percent. Most preferably, the locust bean gum is at about 0.112 percent. The guar gum comprises between about 0.02 and about 0.12 percent of the liquid composition. More preferably, the guar gum is between about 0.02 and about 0.09 percent. Most preferably, the guar gum is at about 0.07 percent.

Emulsifiers are also added together with the stabilizers and include those from the approved list found in the standards for ice cream. For example, monoglycerides, diglycerides, polyoxyethylene (20), polyoxyethylene sorbitan monooleate, sorbitan tristerate polysorbate (80), and diactyl sodium sulfosuccinate, and mixtures thereof. The emulsifier helps to control the liquid mix from inefficient and excessive foaming and, in turn, controls the aerated frozen dessert from excessive overrun. In addition, the emulsifier functions with the stabilizers to produce a uniform size distribution of air cells comparable to that typically found in frozen ice cream. Preferably, the emulsifier consists essentially of a mixture of monoglycerides and diglycerides. More preferably, the emulsifier consists essentially of a mixture of monoglycerides and diglycerides having a complete melting point of 140° F. or higher and an alpha-monoglyceride content of 40 percent or higher.

According to the most preferred embodiment the preferred emulsifier, consisting essentially of a mixture of monoglycerides and diglycerides, is added to the liquid composition together with the preferred stabilizers, consisting essentially of a mixture of carrageenan, locust bean gum, and guar gum.

Where the preferred emulsifiers are added with the liquid composition they are present at a level of at least about 0.05 percent of the liquid composition. Preferably, they are at a level between about 0.05 and about 0.45 percent. More preferably, they are between about 0.05 and about 0.25 percent. Most preferably, they are at about 0.2 percent.

The sweetener used is preferably selected from sucrose, fructose, corn syrups, corn syrup solids, dextrose, honey, invert sugar, high fructose corn syrup, and mixtures thereof is added to the liquid composition. More preferably, the sweetener is sucrose, corn syrup, or a mixture thereof. Most preferably the sweetener consists essentially of a combination of sucrose and corn syrup.

Preferably, the sweetener comprises, on a solids basis, at least about 10 percent of the liquid composition. Preferably, the sweetener comprises, on a solids basis, between about 10 and about 15 percent of the liquid composition.

Other nonfat aerated frozen dairy desserts of similar composition but of a "diet" type can be created with the present invention without the sweetener and corn syrup solids but using a combination of high intensity sweeteners such as aspartame, acesulfame K, and bulking agents such as polydextrose, polyhydric alcohols - sorbitol, mannitol, glycerol, and/or low intensity sweeteners such as the dextrins or maltodextrins to achieve a further reduction in calories.

Flavors and colors may also optionally be added to the liquid composition or to the frozen product before packaging. The flavors and colors can include the same wide variety of flavors, colors, fruits, nuts, cookies, fudges, variegates, and other combinations of ingredients as can be found in the conventional fat containing soft or hard frozen aerated dairy desserts.

The flavors and colors may comprise between about 0.01 to about 20 percent of the frozen dairy dessert. Preferably, no more than about 20 percent of flavor and colors are present in the liquid composition.

For example, where a vanilla flavor is desired, known vanilla flavors, including natural, artificial, and mixtures thereof may be added. Preferably, the flavor will comprise between about 0.05 and about 0.20 percent of the liquid composition.

The resulting liquid composition is agitated until the mixture is completely uniform and all soluble ingredients are in solution. The batch is heated to at least about 145° F. for homogenization prior to pasteurization. Preferably, the temperature is between about 145° and 170° F.

The liquid composition is then preferably homogenized using single stage homogenization with a pressure at least about 1800 p.s.i. to produce a uniform particle size distribution throughout the liquid composition.

More preferably, the pressure of homogenization is between about 1800 and about 2500 p.s.i. The temperature during homogenization is preferably at least about 145° F. More preferably, the temperature is between about 145° and about 175° F. for optimum finished product quality.

Alternatively, a two stage homogenizer can be utilized instead of a single stage homogenizer with all of the 1800 to 2500 p.s.i. pressure coming from the first stage. A two stage homogenizer having low pressure in the second stage with a high pressure in the first stage can also be used. In this case the second stage preferably has a pressure of at least about 180 p.s.i. More preferably, the pressure in this second stage is between about 180 and 300 p.s.i. The first stage pressure is then adjusted so that the final total homogenization pressure is preferably at least about 2000 p.s.i. More preferably, the final total pressure is between about 2000 and about 2500 p.s.i.

Alternate shearing or homogenizing devices such as an APV Guardian Micro-Gap Homogenizer, Cherry Buvell Votater, shear pumps, and colloid mills have been found to perform satisfactorily. For example, where a chocolate pre-mix, described below, is used, slightly lower homogenization pressures are required due to the contribution of cocoa to the final liquid composition.

After homogenization, the liquid composition is pasteurized either in a batch pasteurizer process apparatus or preferably in a continuous pasteurizer apparatus using a high temperature and a short residence time. When a batch process is utilized, the temperature should by at least about 170° F. at a time of at least 20 minutes.

When the preferred continuous high temperature—short time process is used, the temperature is preferably at least about 180° F. with a residence time of at least 25 seconds. More preferably the residence time is between about 25 and about 120 seconds. In either method, if the temperature is increased the pasteurization time can be decreased according to Public Health Standard.

In either process, when the pasteurization is complete, the mix should be cooled as rapidly as possible to at least 40° F. or below. Rapid cooling will retard microbiological growth and will also influence viscosity and flavor characteristics.

Thereafter, the mix can be frozen in conventional ice cream freezing equipment to a preferred overrun of at least about 80 percent. More preferably, the overrun is between about 80 and about 120 percent. Most preferably, the overrun is between about 80 and about 85 percent to achieve the maximum quality attributes.

Prior to processing of the nonfat frozen desserts, care must be taken to properly clean the conventional batch or continuous freezing equipment to remove any fat residues from the equipment because the fat will inhibit whipping and aeration of the nonfat frozen dairy dessert thereby affecting the overrun, body, and texture of the final product.

The equipment should be set to deliver the aerated, frozen product from the whipping chamber at a temperature of at least about 28° F. More preferably, the temperature should be between about 16° and 28° F.

The addition of fruits, nuts, variegating sauces, candies, and flavorings can be done exactly as with conventional ice cream products before packaging.

After packaging, the nonfat frozen dairy dessert should be moved to a hardening room set at a temperature of at least about −30° F. for final freeze down. More preferably, the temperature should be between about −30° and about −40° F. The final freeze down temperature should be achieved as quickly as possible.

Special ingredients can be employed to achieve cholesterol free, fat free frozen desserts consistent with the claims of the present patents. Low fat, cholesterol free type frozen aerated desserts containing fat from sources other than butterfat or other animal sources can be produced where contained in such ingredients as nut meats, chocolate, cocoa, and various fat containing coatings, chips, or flakes.

In another embodiment, the nonfat frozen dairy dessert of the present invention is made with a pre-mix or dry blend which is added to the liquid ingredients described above together with a sweetener and corn syrup.

The pre-mix can also be used to produce the nonfat soft serve dairy dessert and the nonfat frozen and soft serve yogurt desserts described below.

The composition and use of the pre-mix will first be described in relation to the nonfat frozen dairy dessert described above. The pre-mix is added to the liquid composition such that it comprises between about 5 and about 6 percent of the liquid composition. More preferably, the pre-mix comprises about 5.2 percent of the liquid composition.

The pre-mix will preferably consist essentially of dextrin type solids, egg albumen, emulsifiers, and stabilizers together with flavors, colors, and a sweetener.

The dextrin type solids of the present embodiment include those described above in the most preferred embodiment for frozen dairy dessert. More preferably, the dextrin type solids consist essentially of maltodextrin.

The level of the dextrin type solids is at least about 40 weight percent of the pre-mix. Preferably, the dextrin type solids are present at between about 40 and about 80 percent. Levels below about 40 percent typically result in a pre-mix that is weak bodied. Levels above about 80 percent typically result in a pre-mix that lacks sweetness and has a cereal type flavor. More preferably, the dextrin type solids are present at about 76 percent.

The second component of the pre-mix includes egg albumen as described above. Preferably, the egg albumen is from dried egg whites.

The egg albumen is at a level of at least about 2 percent of the pre-mix. Preferably the egg albumen is between about 2 and about 20 percent of the pre-mix. At a level above about 20 percent, the flavor and texture of the frozen dessert are adversely affected. Most preferably, the egg albumen is present at about 10 percent.

Stabilizers used in the present invention include those described above in the most preferred embodiment for frozen dessert. Preferably the stabilizers consist essentially of a mixture of carrageenan, locust bean gum, and guar gum.

The stabilizers are at a level of at least about 1.5 percent of the pre-mix. Preferably, the stabilizers are between about 1.5 and about 8 percent. More preferably, the stabilizers are present at about 7.5 percent.

Emulsifiers are also added with the stabilizers and include those described above in the most preferred embodiment for frozen dessert. Preferably, the emulsifier consists essentially of a mixture of monoglycerides and diglycerides. The emulsifiers are added to the pre-mix at a level of at least about 1 percent of the pre-mix. Preferably, they are present at between about 1 and about 8 percent. More preferably they are present at about 4 percent.

Flavors, colors and a sweetener diluent may optionally be added to the pre-mix for standardization purposes to provide the desired characteristics simulating typical frozen desserts. The flavors and colors typically comprise between about 0.5 and about 5 percent of the pre-mix. The sweetener diluent, if needed for standardization comprises the balance of the pre-mix.

In another embodiment, a chocolate pre-mix or dry blend may be prepared. In this embodiment, cocoa is added at a level of at least about 30 percent to partially replace the dextrin type solids. Preferably, the cocoa comprises between about 30 and about 40 percent of the pre-mix. Most preferably, the cocoa is present at about 35 percent.

Where a vanilla nonfat soft serve dairy dessert is desired, the plain pre-mix of the preferred embodiment, as described above, is added to the MSNF, sweetener, water, and flavor. Preferably, the pre-mix is at a level of about 5.20 percent.

In this soft serve embodiment, the MSNF preferably comprises between about 8 and about 14 percent of the liquid composition. More preferably, the MSNF are at about 12.25 percent. The sweetener is preferably sucrose and is at a level between about 7 and about 12 percent. More preferably, the sweetener is at about 11.55. The water or moisture is preferably between about 64 and about 72 percent. More preferably, the moisture is at about 71 percent. The flavor is added to comprise the balance. Preferably the flavor is at a level of about 0.20 percent.

Alternatively, a chocolate pre-mix can be utilized to produce a chocolate flavored nonfat soft serve dairy dessert. In this embodiment, the chocolate pre-mix at a level of about 8.25 percent is added to the ingredients as described for the plain soft serve dairy dessert except no flavor is added. In addition, the sweetener is preferably at about 9.50 percent, the MSNF are present at about 12.25 percent, and the water is at about 70 percent.

The processing of the vanilla and chocolate flavor soft serve dairy desserts are identical and the mix processing, homogenization and pasteurization of the liquid ingredients are the same as described for the nonfat frozen dairy dessert. After pasteurization, the liquid composition should be cooled as quickly as possible to at least 40° F. Preferably, the composition should be cooled to a temperature between about 30° and about 40° F.

Thereafter, the composition should be stored at a temperature of about 40° F. throughout the entire distribution system until used by the consumer. Preferably, the composition should be stored at a temperature between about 30° and about 40° F.

At the site of use, the composition is frozen in conventional fat containing ice cream soft serve freezers down to at least 22° F. to produce the desired overrun. More preferably, the composition is cooled to a temperature between about 18° and about 20° F. The preferred overrun is at least 30 percent. More preferably, the overrun is between about 30 and about 60 percent.

In another embodiment of the present invention, nonfat hard frozen yogurt may be produced by adding nonfat yogurt solids to the pre-mix and liquid composition identified in the most preferred embodiment of the nonfat frozen dairy dessert. The nonfat yogurt solids include the unsweetened cultured product containing viable live organisms.

The nonfat yogurt solids are typically added after the liquid composition has been pasteurized and cooled according to the method described for the nonfat frozen dairy dessert. The yogurt solids are added so that the liquid composition contains at least about 10 percent of plain yogurt. Preferably, the nonfat yogurt comprises between about 10 and about 30 percent of the liquid composition. More preferably, the nonfat yogurt comprises about 25 percent of the liquid composition.

In this embodiment, the MSNF preferably comprise between about 3 and about 14 percent of the liquid composition. Preferably, the MSNF comprise about 9.25 percent of the liquid composition. The sweetener and corn syrup are present at the levels as described in the preferred embodiment of the nonfat frozen dairy dessert. The pre-mix comprises between about 5 and about 6 percent of the liquid composition. More preferably, the pre-mix is at a level of about 5.2 percent, the sweetener is at a level of about 11.55 percent, the corn syrup is at a level of about 7.50 percent, and the water is at a level of about 41.50 percent.

Another embodiment of the present invention is directed towards nonfat soft serve yogurt. The nonfat yogurt solids are typically added to the liquid composition of the preferred embodiment of the nonfat soft serve dairy dessert after the liquid composition has been pasteurized and cooled according to the method described for the nonfat soft serve dairy dessert. This embodiment contains at least 10 percent of nonfat yogurt. More preferably, the nonfat soft serve yogurt contains between about 10 percent and about 30 percent nonfat yogurt. Most preferably, the nonfat soft serve yogurt contains 25 percent nonfat yogurt.

In this embodiment, the sweetener and pre-mix are at about the level described in the preferred embodiment of the nonfat soft serve dairy dessert. More preferably, the sweetener is at about 11.55 percent, the pre-mix is at about 5.20 percent, the amount of MSNF added is about 9.25 percent, and the water is about 49 percent.

EXAMPLES

The following examples are provided by way of explanation and illustration. As such, these examples are not to be viewed as limiting the scope of the invention as defined by the appended claims.

In Example 1, a pre-mix having the composition described in Table 1 used to prepare vanilla nonfat frozen dairy desserts according to the most preferred method.

TABLE 1

| INGREDIENT | Pre-mix formulation % |
|---|---|
| Dextrin Type Solid Maltodextrin | 76 |
| Egg Albumen Dried Egg White | 10 |
| Emulsifier Monoglycerides and Diglycerides | 4 |
| Stabilizers Carrageenan | 0.25 |
| Locust Bean Gum | 2 |
| Guar Gum | 1.3 |
| Flavor | 2.1 |
| Sweetener diluent Sugar | 4.35 |
|  | 100.00 |

All values are percent by weight of the liquid composition.

EXAMPLE 1
NONFAT VANILLA FROZEN DAIRY DESSERT

| INGREDIENT | PRODUCT | | | | | |
|---|---|---|---|---|---|---|
|  | A | B | C | D | E | F |
| Sweetener Sucrose | 11.55 | 11.05 | 11.55 | 11.55 | 8.70 | 8.50 |
| Corn Syrup, 42DE | — | 8.10 | — | — | — | 7.80 |
| Corn Syrup, 36DE | 7.50 | — | 7.50 | 7.50 | 6.25 | — |
| High Fructose Corn Syrup (42% Fructose 71°) | — | — | — | — | 4.00 | 4.00 |
| Pre-mix or Dry Blend | 5.20 | 5.20 | 5.20 | 5.20 | 5.20 | 5.20 |
| Milk Solids Non Fat, Low or High Heat | 12.25 | 12.25 | 6.30 | — | 12.25 | 12.25 |
| Condensed Skim Milk (30% MSNF) | — | — | — | 26.90 | — | — |
| Skim Milk (8% MSNF) | — | — | 69.25 | 48.65 | — | — |
| Water | 63.30 | 63.20 | — | — | 63.40 | 62.05 |
| Vanilla Extract | 0.20 | 0.20 | 0.20 | 0.20 | 0.20 | 0.20 |
|  | 100.00 | 100.00 | 100.00 | 100.00 | 100.00 | 100.00 |

All values are percent by weight of the liquid composition.

The vanilla nonfat frozen dairy desserts produced in Example 1 when compared side by side exhibited acceptable taste and texture characteristics.

Example 2 shows a chocolate flavored nonfat frozen dairy dessert made according to an alternative embodiment of the present invention.

EXAMPLE 2
CHOCOLATE NONFAT FROZEN DAIRY DESSERT

| INGREDIENT | PRODUCT | | | |
|---|---|---|---|---|
|  | A | B | C | D |
| Sweetener Sucrose | 14.75 | 14.60 | 14.75 | 14.75 |
| Corn Syrup 42DE | — | 3.00 | — | — |
| Corn Syrup 36DE | 2.80 | — | 2.80 | 2.80 |
| Chocolate Pre-mix | 8.25 | 8.25 | 8.25 | 8.25 |
| MSNF, Low or High Heat | 12.25 | 12.25 | 6.40 | — |
| Condensed Skim (30% MSNF) | — | — | — | 27.45 |
| Skim Milk (8.6% MSNF) | — | — | 67.80 | 46.75 |
| Water | 61.95 | 61.90 | — | — |
|  | 100.00 | 100.00 | 100.00 | 100.00 |

All values are percent by weight of the liquid composition.

The nonfat frozen dessert products made according to Example 2 were very comparable to the vanilla nonfat frozen dairy dessert products.

Example 3 shows the formulations of the plain soft serve dairy dessert, the chocolate flavor soft serve dairy dessert, the nonfat frozen yogurt dessert, and the nonfat soft serve yogurt dessert made according to their most preferred embodiment.

EXAMPLE 3

| INGREDIENT | PRODUCT | | | |
|---|---|---|---|---|
|  | A | B | C | D |
| Sweetener Sucrose | 11.55 | 9.50 | 11.55 | 11.55 |
| Corn Syrup 36DE | — | — | — | 7.50 |
| Pre-Mix Plain | 5.20 | — | 5.20 | 5.20 |
| Pre-Mix Chocolate | — | 8.25 | — | — |
| MSNF, Low or High Heat | 12.25 | 12.25 | 9.25 | 9.25 |
| Water | 70.80 | 70.00 | 49.00 | 41.50 |
| Flavor | 0.20 | — | — | — |
| Yogurt Plain (12% MSNF) | — | — | 25.00 | 25.00 |

-continued

| | EXAMPLE 3 | | | |
|---|---|---|---|---|
| | PRODUCT | | | |
| INGREDIENT | A | B | C | D |
| | 100.00 | 100.00 | 100.00 | 100.00 |

All values are percent by weight of the liquid composition.
Product A — nonfat soft serve dairy dessert (plain flavor)
Product B — nonfat soft serve dairy dessert (chocolate flavor)
Product C — nonfat soft serve yogurt dessert
Product D — nonfat frozen yogurt dessert Example 4 was carried out to determine the effects of varying the levels of some of the ingredients while holding the other ingredients at relatively the same level. The sweetener and corn syrup were varied to adjust the freezing point as needed.

A taste test panel, comprised of six trained panelists, was used to rate the nonfat frozen dairy dessert made according to the most preferred method. In the tests, the amount of one ingredient was varied to determine its effect on the product. For each product, the panelists rated its flavor, sweetness, texture or mouthfeel, and coldness to determine an overall rating.

| EXAMPLE 4 | | |
|---|---|---|
| INGREDIENT | AMOUNT (percent) | RATING |
| Dextrin type solids | | |
| Maltodextrin | 2.0 | 3 |
| | 4.0 | 1 |
| | 6.0 | 2 |
| Egg Albumen | | |
| Dried Egg White | 0.25 | 2 |
| | 0.75 | 1 |
| | 1.25 | 3 |
| MSNF | 9.0 | 1 |
| | 12.25 | 2 |
| | 15.0 | 3 |
| Emulsifier | | |
| Mixture of | 0.05 | 3 |
| Monoglycerides | 0.25 | 1 |
| and Diglycerides | 0.45 | 2 |
| Stabilizers | | |
| Guar Gum | 0.02 | 1 |
| | 0.07 | 2 |
| | 0.12 | 2 |
| Locust Bean Gum | 0.05 | 1 |
| | 0.15 | 2 |
| | 0.25 | 3 |
| Carrageenan | 0.01 | 3 |
| | 0.03 | 2 |
| | 0.05 | 1 |

RATING
1 refers to the panel's first choice overall
2 refers to the panel's second choice overall
3 refers to the panel's last choice overall It was observed that all of the products were acceptable. It was also found that the highest overall rating was not always obtained when the most preferred level of an ingredient was used. This is because when processing the nonfat desserts of the present invention other factors such as heat shock and shelf life stability must be considered.

It should be noted that although much of the discussion has involved frozen and soft serve dairy desserts and frozen and soft serve yogurt desserts, all other modifications which are within the ordinary skill in the art to make are considered to lie within the scope of the invention as defined by the appended claims.

I claim:

1. A nonfat aerated dairy dessert produced from a liquid composition, said liquid composition comprising:
   at least about 9 weight percent milk solids nonfat;
   at least about 62 weight percent water;
   a sweetener;
   between about 2 and about 6 weight percent starch hydrolysate selected from the group comprising dextrins, maltodextrins, low conversion corn syrup, and mixtures thereof;
   between about 0.25 and about 1.25 weight percent egg albumen;
   between about 0.08 and about 0.42 weight percent stabilizer; and
   between about 0.05 and about 0.45 weight percent emulsifier.

2. The dairy dessert of claim 1 where the milk solids nonfat are provided by a source selected from the group consisting essentially of nonfat dry milk, skim milk, condensed skim milk, and mixtures thereof.

3. The dairy dessert of claim 1 wherein the milk solids nonfat comprise between about 9 and about 15 percent of the liquid composition.

4. The dairy dessert of claim 1 wherein the water comprises between about 62 and about 68 weight percent of the liquid composition.

5. The dairy dessert of claim 1 wherein the water comprises about 63 weight percent of the liquid composition.

6. The dairy dessert of claim 1 where the starch hydrolysate consists of maltodextrins.

7. The dairy dessert of claim 6 wherein the maltodextrins comprise at least about 2 weight percent of the liquid composition.

8. The dairy dessert of claim 6 wherein the maltodextrins comprises between about 2 and about 6 weight percent of the liquid composition.

9. The dairy dessert of claim 6 wherein the maltodextrins comprises about 4 weight percent of the liquid composition.

10. The dairy dessert of claim 1 where the sweetener is selected from the group comprising sucrose, fructose, corn syrups, corn syrup solids, dextrose, honey, invert sugar, high fructose corn syrup, and mixtures thereof.

11. The dairy dessert of claim 1 where the sweetener is sucrose.

12. The dairy dessert of claim 1 where the sweetener consists essentially of a mixture of corn syrup and sucrose.

13. The dairy dessert of claim 10 wherein the sucrose comprises at least about 10 weight percent of the liquid composition.

14. The dairy dessert of claim 10 wherein the sucrose comprises between about 10 and about 15 we.ight percent of the liquid composition.

15. The dairy dessert of claim 1 wherein the egg albumen consists essentially of dried egg whites.

16. The dairy dessert of claim 15 wherein the egg albumen comprises between about 0.25 and 0.75 weight percent or the liquid composition.

17. The dairy dessert of claim 15 wherein the egg albumen comprises about 0.5 weight percent of the liquid composition.

18. The dairy dessert of claim 1 wherein the stabilizer is selected from the, group comprising gum arabic, guar gum, locust bean gum, carrageenan, cellulose gel, carboxymethyl cellulose, xanthan gum, alginate, konjac flour, gellan gum, and mixtures thereof.

19. The dairy dessert of claim 1 where the stabilizer consists essentially of a mixture of carrageenan, locust bean gum, and guar gum.

20. The dairy dessert of claim 19 wherein carrageenan comprises between about 0.01 and 0.05 weight percent of the liquid composition, the locust bean gum comprises between about 0.05 and 0.25 weight percent of the liquid composition, and the guar gum comprises between about 0.02 and 0.12 weight percent of the liquid composition.

21. The dairy dessert of claim 1 wherein the emulsifier is selected from the group comprising monoglycerides, diglycerides, polyoxyethylene (20), polyoxyethylene sorbitan monooleate, sorbitan tristerate polysorbate (80), and diactyl sodium sulfosuccinate, and mixtures thereof.

22. The dairy dessert of claim 1 where the emulsifier consists essentially of a mixture of monoglyceride and diglyceride.

23. The dairy dessert of claim 1 further comprising between about 3 and about 15 weight percent corn syrup solids.

24. The dairy dessert of claim 1 further having at least about 80 percent overrun.

25. The dairy dessert of claim 1 further having between about 80 and about 120 percent overrun.

26. A pre-mix for a liquid composition used in making a nonfat aerated dessert comprising:
   at least about 40 weight percent starch hydrolysate selected from the group comprising dextrins, maltodextrins, low conversion corn syrup, and mixtures thereof;
   at least about 2 weight percent egg albumen;
   at least about 1.5 weight percent stabilizer; and
   at least about 1 weight percent emulsifier.

27. The pre-mix of claim 26 wherein the starch hydrolysate comprises between about 40 and about 80 weight percent of the pre-mix.

28. The pre-mix of claim 26 wherein the egg albumen comprises between about 2 and about 20 weight percent of the pre-mix.

29. The pre-mix of claim 26 wherein the stabilizer comprises between about 1.5 and about 8 weight percent of the pre-mix.

30. The pre-mix of claim 26 wherein the emulsifier comprises between about 1 and about 8 weight percent of the pre-mix.

31. The pre-mix of claim 26 which is in the form of a dry powder.

32. The pre-mix of claim 26 wherein the starch hydrolysate consists essentially of maltodextrins.

33. The pre-mix of claim 26 wherein the egg albumen comprises dried egg whites.

34. The pre-mix of claim 26 wherein the stabilizer is selected from the group comprising gum arabic, guar gum, locust bean gum, carrageenan, cellulose gel, carboxymethyl cellulose, xanthan gum, alginate, konjac flour gellan gum, and mixtures thereof.

35. The pre-mix of claim 26 wherein the stabilizer consists essentially of carrageenan, locust bean gum, guar gum, and mixtures thereof.

36. The pre-mix of claim 26 wherein the emulsifier is selected from the group comprising monoglycerides, diglycerides, polyoxyethylene (20), polyoxyethylene sorbitan monooleate, sorbitan tristerate polysorbate (80), and diactyl sodium sulfosuccinate, and mixtures thereof.

37. The pre-mix of claim 26 wherein the emulsifier consists essentially of monoglyceride, diglyceride, and mixtures thereof.

38. The pre-mix of claim 26 further containing at least about 30 weight percent of cocoa.

39. A nonfat aerated yogurt dessert comprising:
   between about 3 and about 14 weight percent milk solids nonfat;
   at least about 65 weight percent water;
   a sweetener;
   between about 0.25 and about 5.0 weight percent nonfat yogurt solids; and,
   between about 5 and about 6 percent of a pre-mix, the pre-mix comprising;
   at least about 40 weight percent starch hydrolysate selected from the group comprising dextrins, maltodextrins, low conversion corn syrup, and mixtures thereof,
   at least about 0.25 weight percent egg albumen,
   at least about 1.5 weight percent stabilizer,
   at least about 1 weight percent emulsifier.

40. A method of making a liquid composition for a nonfat aerated dairy dessert comprising:
   combining the following ingredients:
      at least about 9 weight percent milk solids nonfat,
      at least about 62 weight percent water,
      a sweetener,
      between about 2 and about 6 weight percent starch hydrolysate selected from the group comprising dextrins, maltodextrins, low conversion corn syrup, and mixtures thereof,
      between about 0.25 and about 1.25 weight percent egg albumen,
      between about 0.08 and about 0.42 weight percent stabilizer, and
      between about 0.05 and about 0.45 weight percent emulsifier;
   mixing said ingredients under high agitation to thoroughly combine the ingredients thereby producing a liquid composition.

41. A method of making a liquid composition for a nonfat aerated dairy dessert comprising:
   combining the following ingredients:
      at least about 9 weight percent milk solids nonfat,
      at least about 62 weight percent water,
      a sweetener;
      a pre-mix comprising;
         at least about 40 weight percent starch hydrolysate selected from the group comprising dextrins, maltodextrins, low conversion corn syrup, and mixtures thereof,
         at least about 0.25 weight percent egg albumen,
         at least about 1.5 weight percent stabilizer,
         at least about 1 weight percent emulsifier,
   mixing said ingredients under high agitation to thoroughly combine the ingredients thereby producing a liquid composition.

* * * * *